Patented Jan. 1, 1924.

1,479,330

UNITED STATES PATENT OFFICE.

WALTER O. SNELLING, OF ALLENTOWN, PENNSYLVANIA.

PLASTIC PRODUCT.

No Drawing.   Application filed April 30, 1920. Serial No. 377,943.

*To all whom it may concern:*

Be it known that I, WALTER O. SNELLING, a citizen of the United States, residing at Allentown, in the county of Lehigh and State of Pennsylvania, have invented certain Improvements in Plastic Products, of which the following is a specification.

My invention relates to improvements in plastic products, and more particularly to improvements in the preparation of plastic materials useful as substitutes for chicle, gutta percha and substances of like nature.

I have discovered that by mixing resins, (including ordinary rosin or colophony, natural resins, and condensation products such as coumarone resin) with such vulcanized oil products as have been described in U. S. Patent 1,315,246, and preferably by thoroughly incorporating at a somewhat elevated temperature, there occurs a blending of the two materials, to form products having very desirable properties as substitutes for gutta percha, chicle, and like natural rubber-like materials.

As an example of my present invention, I will describe the procedure which I employ in preparing a product which may be used as a gutta percha substitute. I first prepare a factis by incorporating 80 parts by volume of cottonseed oil, 20 parts by volume of carbon bisulfide, and 20 parts by volume of sulfur chloride. This mixture is stirred and poured out in a thin film on a smooth surface, where it soon hardens. To 100 parts by weight of the hardened film, after being ground up to form a meal, I add 3 parts by weight of methyl alcohol, and 170 parts by weight of sulfur monochloride. The factis soon undergoes depolymerization and liquifies, and after a period of about two hours I stir the liquified product into a volume of water which should preferably be ten to twenty times the volume of the depolymerized fluid. The water causes the depolymerized factis to repolymerize, and about 15 min. after being stirred into the water I sheet the repolymerized product by passing it between rolls. By the treatment described I obtain the vulcanized oil product in the form of a light yellow coherent sheet. I next mix a weighed quantity of the sheeted material with an equal weight of rosin, and place this mixture in a vessel containing water, preferably employing a volume of water several times the volume occupied by the mixture of rosin and vulcanized oil product. The water is then heated, preferably to boiling, for a period of about three hours, the mixture of rosin and vulcanized oil product being occasionally stirred to secure complete homogeneity. By the process as described there is obtained a cohesive, tough, rubbery mixture of light tan color, which may be used as a substitute for gutta percha, and for many other purposes.

When it is desired to obtain a somewhat tougher product than that which is obtained by the above described process, it is advisable to employ a factis prepared from linseed oil or soya bean oil, instead of using a factis made from cottonseed oil. The use of a greater quantity of methyl alcohol than described leads to the production of a softer and less tenacious product. Increasing the percentage of rosin used gives a product which tends to be increasingly brittle when cold, while decreasing the percent of rosin gives a product which has increased elasticity.

Instead of employing a vulcanized oil product made as described in the above example, I may employ a vulcanized and depolymerized product made by any of the methods described in U. S. Patent 1,315,246, the characteristics of the resulting products varying in toughness, color, elasticity and plasticity, according to the particular type of vulcanized oil product used.

As another example of my present invention, I will describe the procedure which I may employ in preparing a chicle substitute. I first prepare a factis from cottonseed oil and sulfur chloride, and I then depolymerize this material by the use of sulfur chloride, and repolymerize by contact with water, preferably following the methods outlined in my U. S. Patent 1,315,246, the cottonseed oil and the sulfur chloride being first mixed together, preferably in the presence of a diluent such as carbon bisulfide, and the mixture being then poured out in a thin layer upon a cool surface, where it will harden to form a firm mass of factis. This factis, preferably after standing several days, is then exposed to the vapor of sulfur chloride until it is depolymerized to liquid condition, and the dark colored liquid depolymerization product is then vigorously agitated with water until it solidifies. The product so obtained, preferably after sheeting, is mixed with a suitable resin and heated in water, or warmed and passed between rolls, to insure thorough incorporation. Any resinous material which softens at about the normal temperature of the human body, and which is free from an unpleasant taste, may be employed, but I prefer to employ as my resinous material coumarone resin, styrene resin, pontianak resin, or indene resin, or a mixture of two or more of these resins. I prefer to use a mixture of substantially equal parts by weight of resinous material and of vulcanized oil product in the preparation of a chicle substitute, but it is sometimes desirable to increase or decrease the percentage of resinous material employed, according to the physical characteristic desired in the finished product.

In the preparation of chicle substitutes, as in the preparation of gutta percha and rubber substitutes, I find that I can vary widely from the precise procedure outlined, while still obtaining products having desirable properties, and which are of the same general nature as those prepared by the methods given in the examples stated. In general in the preparation of gutta percha and rubber substitutes, I find it desirable with soft vulcanized oil products to use resinous materials of relatively higher melting point that I use with firmer vulcanized oil products, and I prefer to employ initially tough vulcanized oil products for these uses. In the preparation of chicle substitutes, on the contrary, I prefer to employ the softer types of my vulcanized oil products, with resins or mixtures of resins of relatively low melting point.

I have successfully made plastic products from all of the types of vulcanized oil products described in U. S. Patent 1,315,246, by incorporating these vulcanized oil products with various natural and synthetic resinous materials, and in this way have obtained plastic products of widely varying properties, from tough and highly elastic rubber-like masses to very soft and ductile chicle-like products. It will accordingly be evident that many modifications may be made without departing from the spirit and scope of my invention, and it is therefore to be understood that no limitations are to be imposed upon my invention except as indicated in the appended claims.

I claim:

1. The process which comprises depolymerizing a vulcanized product, repolymerizing the resulting material, and incorporating the material so obtained with a resinous substance.

2. The process which comprises vulcanizing an oil, depolymerizing the factis so obtained, repolymerizing the resulting material, and incorporating the product so obtained with a resin.

3. A chicle substitute comprising a vulcanized oil and a resin.

In testimony whereof, I have hereunto subscribed my name this 29th day of April 1920.

WALTER O. SNELLING.